March 26, 1963   R. W. COLLAR   3,083,042
QUICK CONNECT COUPLING
Filed Aug. 25, 1958

ROLLAND W. COLLAR,
INVENTOR.
WHANN & McMANIGAL
Attorneys for Applicant

United States Patent Office 3,083,042
Patented Mar. 26, 1963

3,083,042
QUICK CONNECT COUPLING
Rolland W. Collar, Sun Valley, Calif., assignor, by mesne assignments, to Lear Siegler, Inc., a corporation of Delaware
Filed Aug. 25, 1958, Ser. No. 756,878
1 Claim. (Cl. 285—93)

The present invention relates generally to couplings for fluid lines, and the like; and is more particularly concerned with couplings for this purpose which may be quickly connected and disconnected.

Conventional quick action couplings have in the main heretofore been constructed with locking elements which have taken the form of spheres or balls. The argument for the use of balls primarily was that it permitted ease of operation. However, the use of balls introduced other problems which were undesirable and prevented the use of such couplings on relatively high fluid pressures. Since the balls operated against adjacent surfaces with point contacts, the use of such balls in couplings for high pressure lines have the inherent disadvantage of producing "Brinelling" effects due to the concentration of pressures at point contacts. The surfaces with which the ball engaged therefore became pitted, and the couplings became unreliable in use.

In the present invention, it is an object to provide locking elements in the form of pins, and provide surface contacts of engagement rather than point or line contacts of engagement. Although at first blush this may appear to be a simple expedient, it has been found that more reliable couplings are obtained, the couplings may be operated with higher pressures, and the useful life of the coupling is prolonged. By way of comparison, tests have indicated that conventional couplings utilizing ball type locking members show a proof pressure of 1800 p.s.i., and a burst pressure of 6800 p.s.i. In the coupling of the present invention for aircraft use, the proof pressure is of the order of 6000 p.s.i., and the burst pressure 12,000 p.s.i.

A further object of the present invention is to provide improved means for latching the coupling in locked position, such means being visibly indicated from the exterior of the coupling. In the conventional quick connect couplings utilizing ball locking elements, the actuating cams have been provided with dwell or detent notches for receiving the balls in the locked position of the coupling, whereby the balls are releasably latched. This arrangement is undesirable in that the sealing member, usually an O-ring between the female and male parts of the coupling, is initially over-compressed and then released when the ball enters the detent notch. In the arrangement of the present invention, wedging surfaces of engagement of the locking members with abutment shoulders of an associated groove act to compress the sealing ring and hold the compressing pressure thereagainst, when the locking pins are in locked position.

Further objects of the invention will be brought out in the following part of the specification, wherein detailed description is for the purpose of fully disclosing the invention without placing limitations thereon.

Referring to the accompanying drawings, which are for illustrative purposes only:

Referring now more specifically to the drawings, for illustrative purposes, the coupling of the present invention is shown as comprising a pair of telescoping members A and B which are arranged to be connected and disconnected in end-to-end relation. The telescoping members are illustrated in the disclosed embodiment as respectively comprising a telescoping member A which forms a male member, and the telescoping member B which forms a female member. The outermost ends of the coupling members may be fabricated with any of the conventional type of arrangements for pipe or conduit connections. In the present instance the ends are merely internally threaded as shown at 10. The external end portions may, if desired, be constructed to form a faceted flange 11 for the reception of a wrench or like tool.

Figure 1:
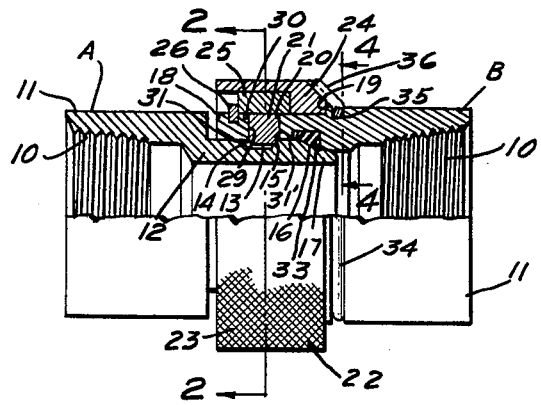
FIG. 1 is a side view of a coupling embodying the features of the present invention, the view including a longitudinal sectioned portion showing the cooperative relationship of the coupling elements in locked position.

The male member A, at its other end has an end portion 12 of reduced outside diameter, as shown in FIG. 1, and is constructed with a circumferentially extending groove 13 having sloped side walls which provide bevelled circumferentially extending shoulders 14 and 15. Axially spaced from the groove 13 towards the outer end of the portion 12, there is further provided a circumferentially extending bevelled shoulder 16 which connects with a tip end portion 17 having a further reduced outer diameter.

The female member B has an end portion 18 of reduced outside diameter which results in the formation of an abutment shoulder 19 therearound. The portion 18, as shown in FIGS. 1 and 2 is provided with a plurality of radially extending openings 20 within which there are reciprocably mounted locking members in the form of pins 21.

The pins 21 are retained by a cam ring structure 22. This structure comprises a spaced sleeve portion 23 which is provided with an inwardly projecting end flange 24 at one end. This end flange is in sliding engagement with the outer surface of the end portion 18, and also abuts the shoulder 19. Housed within the sleeve portion 23 is a cam insert 25 which may be integrally formed with the ring, if desired, but in this case is shown as a separate element. The cam insert is retained in a seated position by means of a snap ring or a spring ring 26 which fits into an associated groove in the adjacent face of the end portion 18. The retaining ring 26 and shoulder 19 thus hold the cam ring 22 and its insert 25 against axial movements, but permit free rotative movements thereof as a unit.

Figure 2:
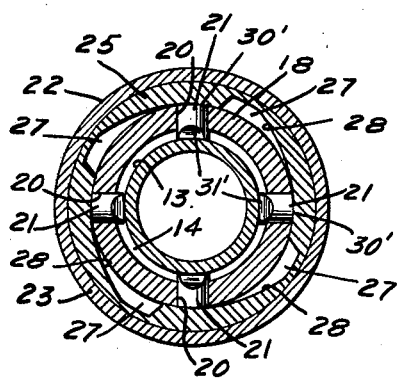
FIG. 2 is a transverse cross-sectional view taken substantially on line 2—2 of FIG. 1.

As shown primarily in FIG. 2, the cam insert has its innermost edge provided with a circular series of cam pockets 27 each encompassing one of the pins 21 and having a cam surface 28 which is adapted in one position of the cam ring to force the associated pin inwardly to a locked position with its innermost end positioned in the groove 13, and in another position of the cam ring release the pin for movement outwardly to withdraw the inner end of the pin from the groove 13.

The pins 21 may have a desired cross section of any configuration. That is, the pins may be made multifaced, or may be of generally circular cross section. In any event, it is desirable to prevent the pin from rotating in its retaining opening. In the disclosed construction, the pin is provided with a flat side portion 29 by removal of the pin material so as to leave an arcuate overhanging lip 30 which is adapted to engage a shoulder in the pin retaining opening and thus limit inward movement of the pin. As shown in FIG. 2, the outermost end surface of the pin 21 is curved or crowned as indicated at 30'. At its innermost end, as shown in FIG. 1, the diametrically opposite sides of the inner end of the pin, are bevelled as indicated by numerals 31 and 31', the latter bevel being greater than the former. By the construction just described for the pin 21, the forces applied between the locking members, in this case the pins 21, and the associated surfaces will be distributed over contact surfaces of engagement, rather than upon point contacts or line engagement.

Figure 3:
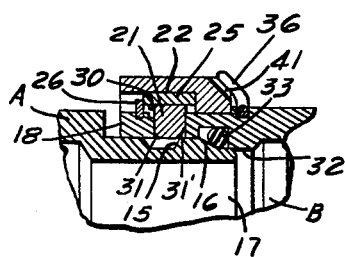
FIG. 3 is a fragmentary longitudinal section, similar to that of FIG. 1, except that the parts are shown in unlocked position.
Figure 4:
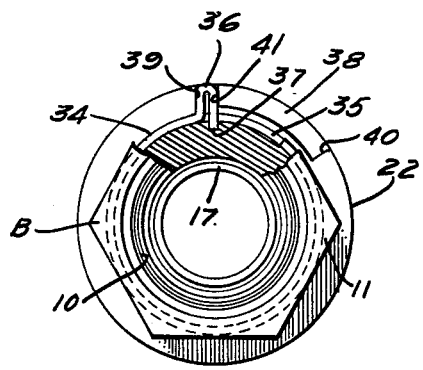
FIG. 4 is an end view of the coupling including a fragmentary section taken substantially on line 4—4 of FIG. 1 to show details of the visual latching mechanism.

Referring to FIG. 3, it will be observed that when the male member A and female member B are moved into telescoped relation, the tip end portion 17 of the male member guidingly enters an internal opening 32 of the female member, and at this point the bevelled shoulder 16 is brought into engagement with an O-ring sealing gasket 33. During this operation, the cam ring 22 will of course be in a position wherein the cam pocket will be of its greatest depth so as to permit the pins 21 to move outwardly sufficiently to permit the male and female members to be telescoped, as explained above. If the connection operation is now continued by manually rotating the cam ring 22 in a counterclockwise direction to the position shown in FIG. 2, the cam surfaces will act to force the pins radially inwardly. As the pins move inwardly, the surface 31' of the pin coacts in each case with the bevelled shoulder 15 of the groove 13 to further force the male and female members into finally seated and sealed position, wherein the bevelled shoulder 16 acts to compress the gasket 33 as shown in FIG. 1 to form a pressure seal between the male and female members.

In conventional couplings of this type, means have been provided for releasably latching the couplings in locked condition. In general these latching arrangements have been concealed and prevent a determination of the coupled condition by visual observation. It is one of the features of the present invention to provide a latching mechanism which is externally visible and permits the coupling condition to be readily and easily determined by visual observation. For this purpose, there is provided an open ended spring ring 34 which is adapted to seat in a circumferentially extending groove 35 in the outer surface of the female member, this groove being located adjacent to the shoulder 19 thereof. At one end, the ring is provided with a looped end portion 36, the free leg of which extends into an opening 37 in the bottom of the groove, thus serving to anchor the ring against rotative movement. As shown in FIG. 1, the looped portion 36 is angularly inclined with reference to the plane of the ring 34, and is disposed in a cutout portion 38 in the adjacent peripheral edge of the cam ring, this cutout portion extending between spaced abutment shoulders 39 and 40. The looped end portion 36 thus forms a stop which is engaged by the shoulder 39, when the cam ring is rotated to a locked position of the pins 21, and is engaged by shoulder 40 when the ring is rotated in an opposite direction to a released position with respect to the pins 21. In order to releasably latch the cam ring in locked position, the cutout portion adjacent the shoulder 39 is provided with a notch 41 in which the looped end portion 36 will seat. With the end portion 36 seated in the notch 41, the cam ring is latchingly retained against inadvertent movement to unlock position, but by the application of slight rotative force may be rotated to an unlocked position wherein the looped end portion is engaged by the abutment shoulder 40. The arrangement just described is visible exteriorly of the coupling, and thus provides a visual check on the condition of the coupling, that is, whether it is in locked or unlocked condition.

Various modifications may suggest themselves to those skilled in the art without departing from the spirit of my invention, and, hence, I do not wish to be restricted to the specific form shown or uses mentioned, except to the extent indicated in the appended claim.

I claim:

In a coupling: a female coupling member having locking member retaining openings therein; a male coupling member having a locking member receiving groove; locking members mounted in said openings for movement into and out of said groove to lock and release said male member; a cam ring mounted on said female member for rotational movement, said ring having two circumferentially spaced abutment shoulders which are located on the exterior of said ring; a spring finger carried by said female member having an end positioned between said shoulders, said ring when moved to position one shoulder against said finger acting to force the locking members into locked position in said groove, and when moved to position the other shoulder against said ring acting to release said locking members for movement out of said groove; and a notch adjacent said one shoulder for receiving said finger to releasably latch the ring against movement to an unlocked position with respect to said locking members, said notch providing a visible indication exteriorly of the coupling as to the locked and unlocked condition of the coupling parts.

References Cited in the file of this patent

UNITED STATES PATENTS

| | | |
|---|---|---|
| 528,929 | Doster | Nov. 13, 1894 |
| 1,117,856 | Kent | Nov. 17, 1914 |
| 1,533,875 | McCleary | Apr. 14, 1925 |
| 2,355,166 | Johanson | Aug. 8, 1944 |
| 2,413,978 | Krone et al. | Jan. 7, 1947 |
| 2,550,421 | Mueller | Apr. 24, 1951 |
| 2,631,872 | Wurmser | Mar. 17, 1953 |
| 2,784,987 | Corcoran | Mar. 12, 1957 |
| 2,828,978 | Wurzburger | Apr. 1, 1958 |

FOREIGN PATENTS

| | | |
|---|---|---|
| 49,276 | Netherlands | Apr. 15, 1940 |